(12) United States Patent
Garneau et al.

(10) Patent No.: US 6,313,445 B1
(45) Date of Patent: Nov. 6, 2001

(54) CONTROL FOR AN ELECTRICAL KITCHEN APPLIANCE WITH POWER INTERRUPTION OFF FEATURE

(75) Inventors: Paul F. Garneau, East Haven; Charles Z. Krasznai, Fairfield; James P. Sandor, Trumbull, all of CT (US)

(73) Assignee: HP Intellectual Corp., Wilmington, DE (US)

(*) Notice: Subject to any disclaimer, the term of this patent is extended or adjusted under 35 U.S.C. 154(b) by 0 days.

(21) Appl. No.: 09/753,995

(22) Filed: Jan. 3, 2001

(51) Int. Cl.[7] .............................. A21B 1/22; A47J 37/08; H01H 63/02; H01H 73/44; H01H 83/06
(52) U.S. Cl. .................... 219/414; 219/412; 219/491; 99/338; 335/20; 335/166; 335/179
(58) Field of Search .................... 219/412, 414, 219/490, 491; 361/147, 194; 335/20, 164, 166, 175, 179, 207; 99/337, 338

(56) References Cited

U.S. PATENT DOCUMENTS

| | | | |
|---|---|---|---|
| 3,627,959 | 12/1971 | Chapell | 200/61 |
| 3,845,272 | 10/1974 | Schultz et al. | 219/386 |
| 3,956,978 | 5/1976 | Borley | 99/329 |
| 4,065,658 | 12/1977 | Keim | 219/386 |
| 4,178,498 | 12/1979 | Snyder | 219/413 |
| 4,345,226 * | 8/1982 | Debaigt | 335/166 |
| 4,864,262 * | 9/1989 | Deb | 335/20 |
| 4,910,634 * | 3/1990 | Pipkorn | 361/147 |
| 5,044,263 | 9/1991 | Birkert et al. | 99/327 |
| 5,293,020 | 3/1994 | Han et al. | 219/724 |
| 5,304,782 | 4/1994 | McNair et al. | 219/518 |
| 5,525,948 * | 6/1996 | Poulsen | 335/128 |
| 5,889,289 | 3/1999 | Krasznai et al. | 219/414 |
| 6,014,925 | 1/2000 | Basora et al. | 99/327 |
| 6,080,967 | 6/2000 | Sandor et al. | 219/414 |
| 6,080,972 * | 6/2000 | May | 219/494 |
| 6,230,611 * | 5/2001 | Mauffrey | 99/337 |

FOREIGN PATENT DOCUMENTS 5-57025 * 3/1993 (JP).

* cited by examiner

*Primary Examiner*—Joseph Pelham
(74) *Attorney, Agent, or Firm*—Barry E. Deutsch

(57) ABSTRACT

An electric appliance control comprising an electromagnet; an electrical switch assembly; a ferromagnetic section movable with a contact of the switch assembly towards the electromagnet; and a user actuated member adapted to move the ferromagnetic section and the contact towards the electromagnet. When the electromagnet is energized and the ferromagnetic section and contact are moved by the user actuated member to an actuated position, the electromagnet can retain the contact at the actuated position by magnetically holding the ferromagnetic section at the actuated position.

18 Claims, 4 Drawing Sheets

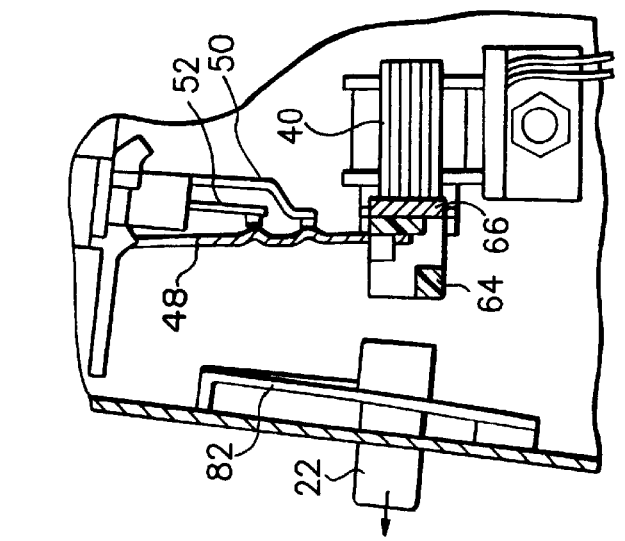
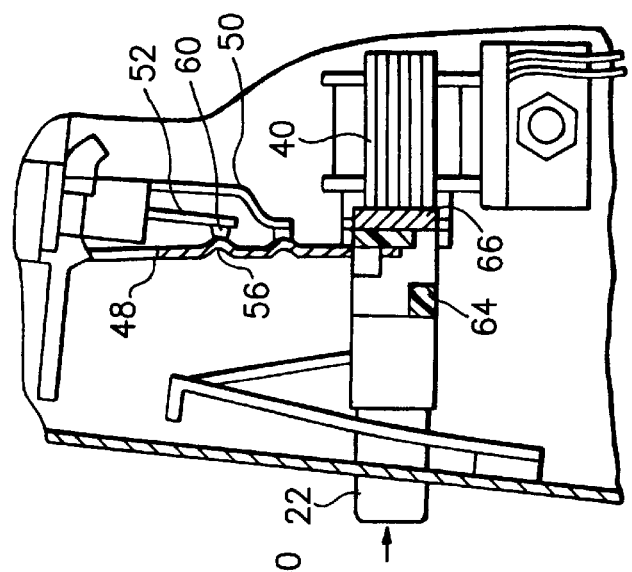
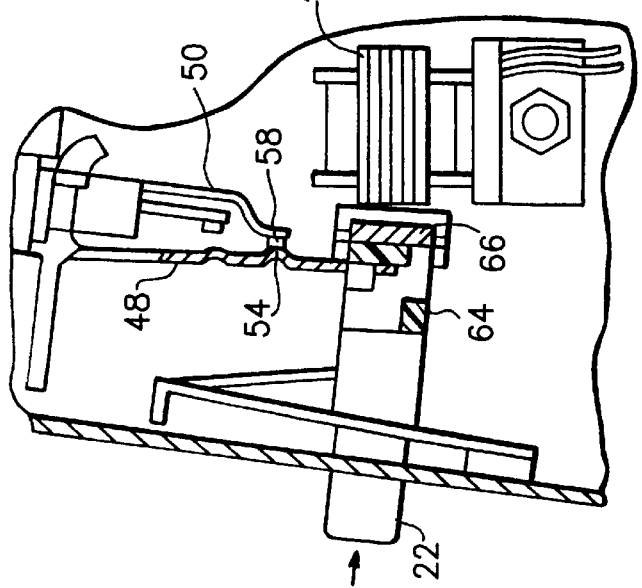

CONTROL FOR AN ELECTRICAL KITCHEN APPLIANCE WITH POWER INTERRUPTION OFF FEATURE

BACKGROUND OF THE INVENTION

1. Field of the Invention

The present invention relates to electrical appliances and, more particularly, to a control for an electrical appliance.

2. Prior Art

U.S. Pat. No. 5,889,259 discloses a toaster oven comprising a user actuated push button, an electrical switch assembly, and a solenoid connected to a printed circuit board for moving a lever to open a switch of the electrical switch assembly and turning OFF a toast cycle of the oven. A potential problem with the oven disclosed in U.S. Pat. No. 5,889,259 is that, in the event of a power failure during a toast cycle and subsequent reactivation of the power supply, the oven could come ON without a user being present. It is desired to prevent the oven from automatically coming back ON in the event of reconnection to a power supply after a power supply disruption.

SUMMARY OF THE INVENTION

In accordance with one feature of the present invention, an electric appliance control is provided comprising an electromagnet; an electrical switch assembly; a ferromagnetic section movable with a contact of the switch assembly towards the electromagnet; and a user actuated member adapted to move the ferromagnetic section and the contact towards the electromagnet. When the electromagnet is energized and the ferromagnetic section and contact are moved by the user actuated member to an actuated position, the electromagnet can retain the contact at the actuated position by magnetically holding the ferromagnetic section at the actuated position.

In accordance with another feature of the present invention, an electric toaster oven is provided comprising a housing; heating elements connected to the housing; and a control for controlling the heating elements. The control comprises a ferromagnetic member connected to an electrical contact of a switch assembly, the switch assembly being connected to the heating elements. The ferromagnetic member is biased by the contact towards a deactuated position. The contact is movable with the ferromagnetic member towards an actuated position. The oven further comprises an electromagnet having a magnet field which, when the ferromagnetic member is located at the actuated position and the electromagnet is energized, magnetically attracts the ferromagnetic member towards the electromagnet. The field is insufficient to move the ferromagnetic member to the electromagnet when the ferromagnetic member is at the deactuated position. When the ferromagnetic member is located at the actuated position and supply of electricity to the toaster oven is interrupted, the ferromagnetic member is moved to the deactuated position and, if the supply of electricity to the toaster oven is subsequently re-established, the electromagnet cannot automatically move the ferromagnetic member back to the actuated position.

In accordance with one method of the present invention, a method is provided for preventing automatic re-energization of an electrical appliance after an interruption in supply of electricity to the appliance. The method comprising steps of biasing a ferromagnetic section by a biasing force towards a deactuated position, the ferromagnetic section being adapted to move a contact of an electrical switch assembly, the ferromagnetic section being movable between the deactuated position wherein a portion of the switch assembly is OFF and an actuated position wherein the portion of the switch assembly is ON; applying an electromagnetic force by an electromagnet to the ferromagnetic section when the ferromagnetic section is moved towards the actuated position to hold the ferromagnetic section at the actuated position; and moving the ferromagnetic section by the biasing force, when the supply of electricity to the appliance is interrupted, to move the ferromagnetic section to the deactuated position. The deactuated position is sufficiently far enough away from the electromagnet to prevent the electromagnet from automatically moving the ferromagnetic section back to the activated position when the supply of electricity is reactivated.

BRIEF DESCRIPTION OF THE DRAWINGS

The foregoing aspects and other features of the present invention are explained in the following description, taken in connection with the accompanying drawings, wherein:

FIG. 3A is an enlarged schematic cross-sectional view of a portion of the control system shown in FIG. 2 at a second position;

FIG. 3B is an enlarged schematic cross-sectional view of the portion of the control system shown in FIG. 2 at a third position; and FIG. 3C is an enlarged schematic cross-sectional view of the portion of the control system shown in FIG. 2 at a fourth position.

DETAILED DESCRIPTION OF THE PREFERRED EMBODIMENT

Figure 1:
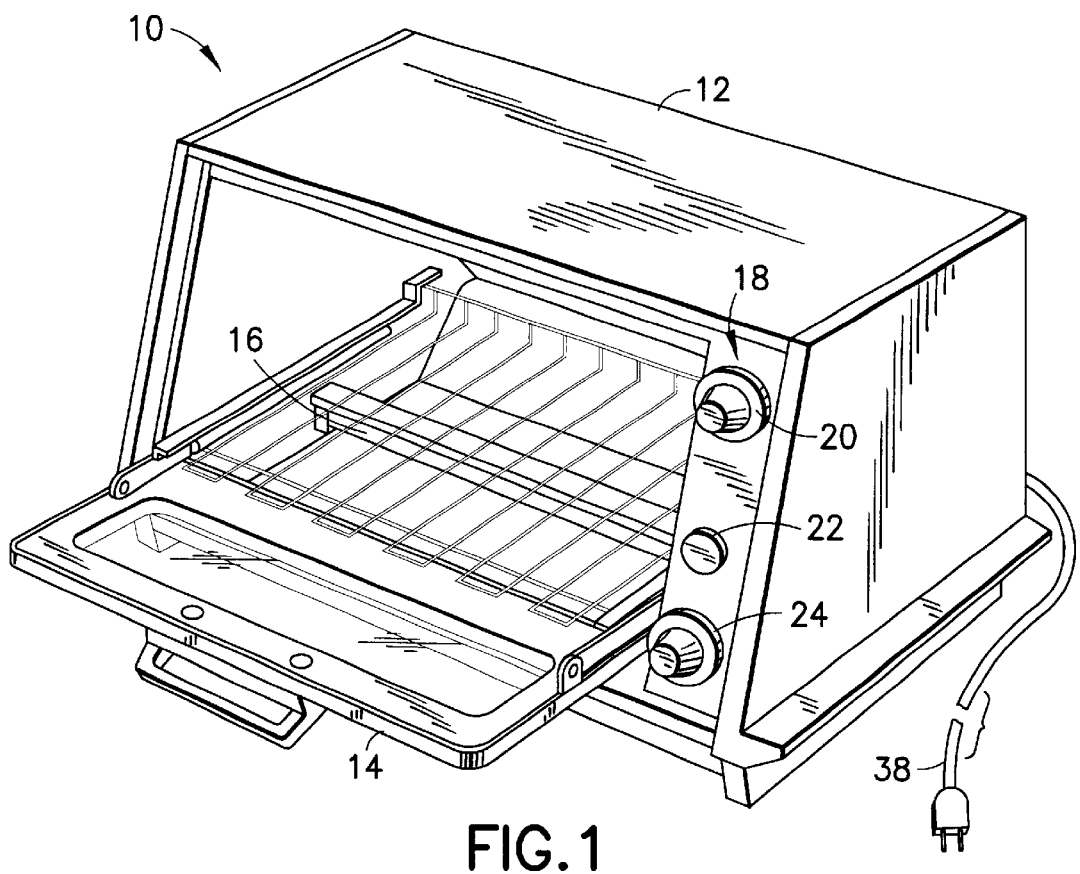
FIG. 1 is a perspective view of a toaster oven incorporating features of the present invention.

Referring to FIG. 1, there is shown a perspective view of an electric toaster oven 10 incorporating features of the present invention. Although the present invention will be described with reference to the single embodiment shown in the drawings, it should be understood that the present invention can be embodied in many alternate forms of embodiments. In addition, any suitable size, shape or type of elements or materials could be used. The present invention could also be incorporated in any other suitable type of electrical kitchen appliance.

Figure 2:
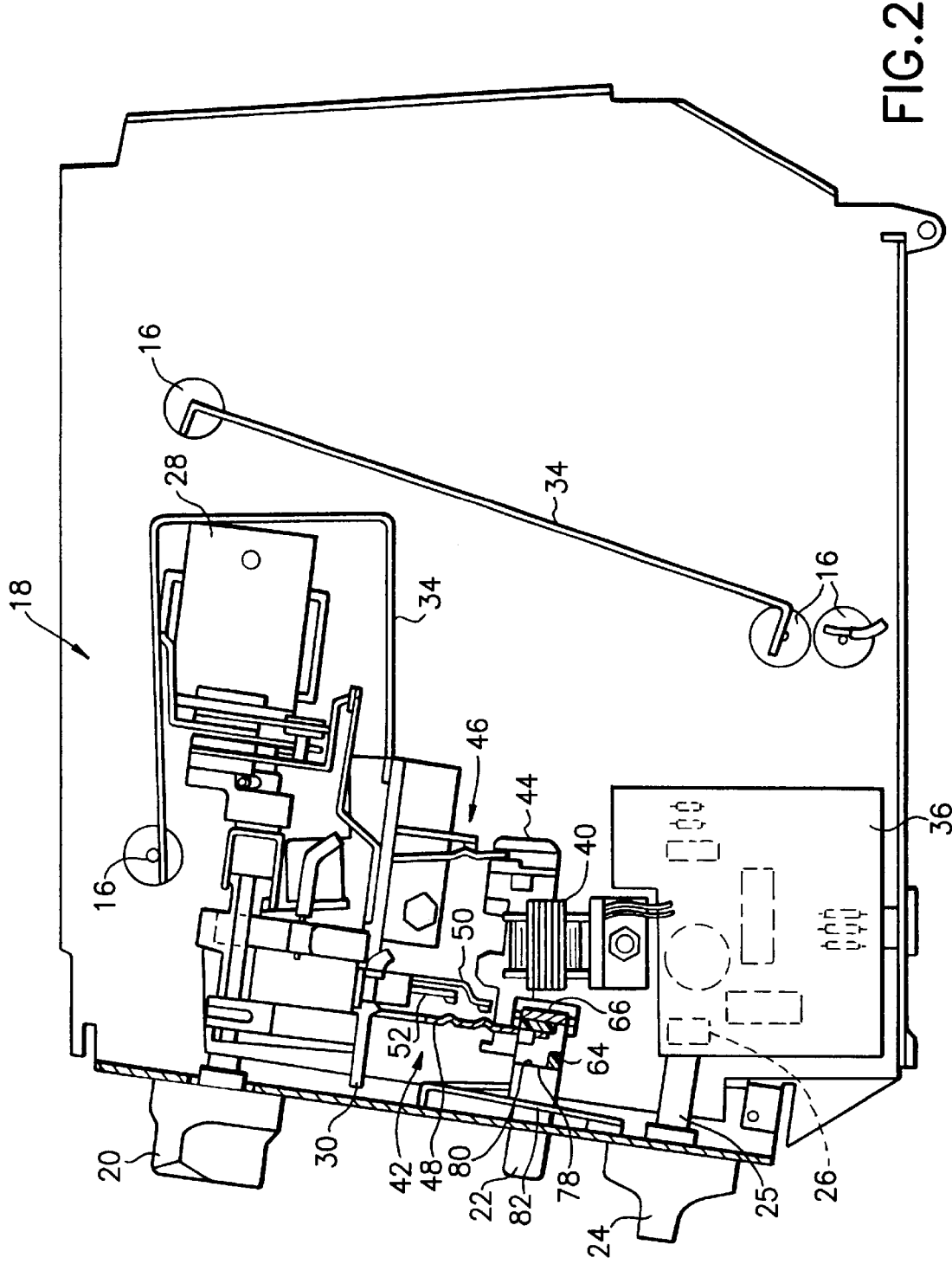
FIG. 2 is a schematic cross-sectional view of the oven shown in FIG. 1 showing the control system at a first OFF position.

The oven 10 generally comprises a housing 12, a door 14, heating elements 16, and a control section 18. The control section 18 includes user actuatable controls including an oven ON/OFF and temperature control knob 20, a toast ON push button 22, and a toast light/dark control knob 24. In alternate embodiments any suitable additional and/or alternative user interface controls could be provided. For example, button 22 may be replaced by a rocker arm type of user actuated switch. Referring also to FIG. 2, the control section 18 includes a toast control thermostat 26, an oven control thermostat 28, and a control switch assembly 30. The oven control thermostat 28 and switch assembly 30 are described in detail in U.S. Pat. No. 5,889,259 issued Mar. 30, 1999 which is hereby incorporated by reference in its entirety. However, any suitable oven control system could be provided or, no oven control need be provided, such as for a toaster or heating appliance that does not have an oven function. Electrical wires (not shown) and electrical bus bars 34 electrically connect the thermostats 26 and 28, to the top and bottom heating elements.

The control for the toast function of the oven includes a printed circuit board 36, an electromagnet 40, the button 22, a first switch portion or section 42 of the switch assembly 30, and the thermostat 26 connected to the toast light/dark control knob 24 by a shaft 25. Preferably, the thermostat 26 is mounted to the printed circuit board 36. However, in an alternate embodiment, such as similar to U.S. Pat. No. 6,080,967, the thermostat could be separate from a printed circuit board toast controller. Similar to the oven described in U.S. Pat. No. 5,889,259, the oven 10 has a slider 44 adapted to open and close a second switch section 46 of the switch assembly based upon whether the door 14 is open or closed. The printed circuit board 36 is electrically connected to the electromagnet 40 to control energization of the electromagnet 40. When energized, the electromagnet creates a magnetic field at its front side; i.e.: facing in a direction towards the push button 22.

Figure 2A:
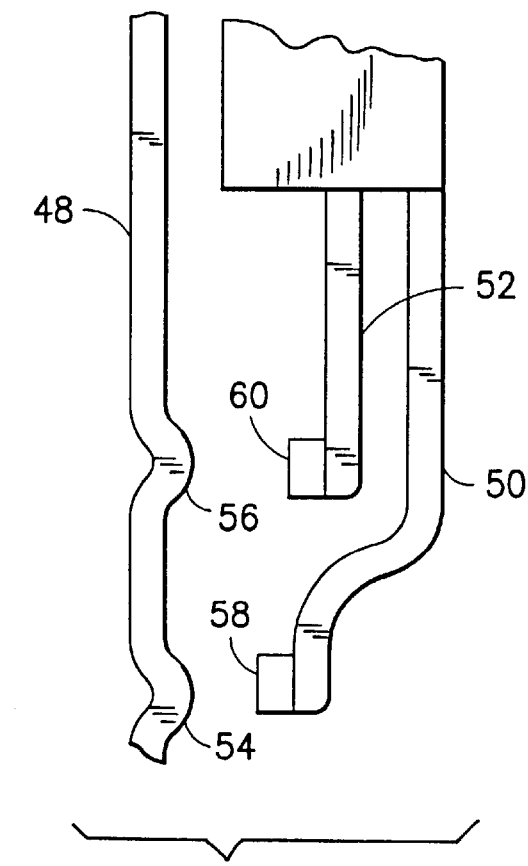
FIG. 2A is an enlarged partial view of contacts of the switch assembly shown in FIG. 2.
Figure 2B:
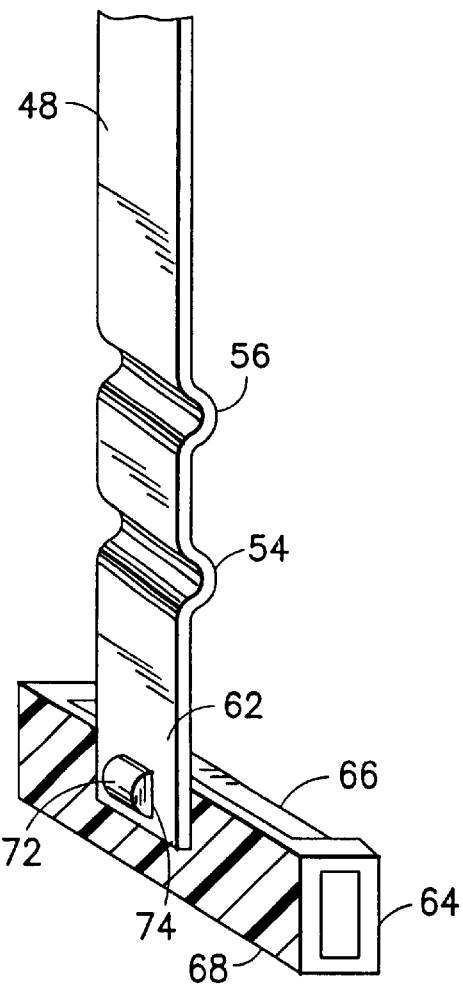
FIG. 2B is a partial perspective view of members of the control system shown in FIG. 2 with a cut-away section.
Figure 2C:
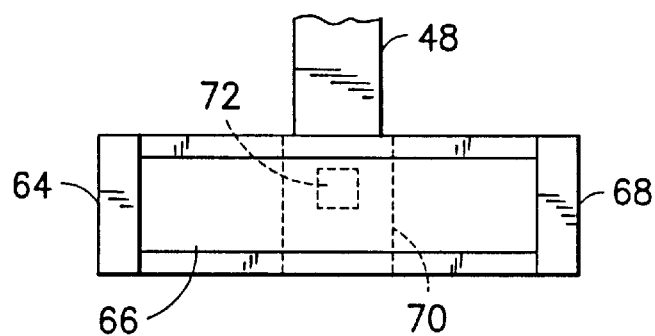
FIG. 2C is a rear elevational view of the members shown in FIG. 2B.

Referring also to FIG. 2A, the first switch section 42 generally comprises a first electrical contact 48, a second electrical contact 50, and a third electrical contact 52. The first contact 48 has two contact areas 54, 56. The second contact 50 has a contact area 58 adapted to be contacted by the contact area 54. The third contact 52 has a contact area 60 adapted to be contacted by the contact area 56. FIGS. 2 and 2A show the relative positions of the contacts 48, 50, 52 at an OFF position of the toaster function; i.e.: the first contact 48 is not making electrical contact with the second and third contact 50, 52. Referring also to FIGS. 2B and 2C, a member 64 is connected to the bottom end 62 of the first contact 48. The member 64 includes a ferromagnetic section 66 and a mechanical contact section 68. The ferromagnetic section 66 is preferably merely a small plate of metal. The contact section 68 is preferably comprised of plastic and fixedly connects to the ferromagnetic section 66 at a rear side of the section 68. The contact section 68 also comprises a pocket 70 and a projection 72 into the pocket 70. The bottom end 62 of the first contact 48 extends into the pocket 70 and has an aperture 74. The projection 72 extends into the aperture 74. These features fixedly attach the member 64 to the first contact 48. However, in alternate embodiments any suitable means could be used to connect the member 64 or the ferromagnetic section 66 to the first contact 48. In another alternative embodiment, the member 64 might not be directly connected to the first contact 48, but could merely be movable relative to the first contact 48 and adapted to contact and move the first contact.

In the position shown in FIGS. 2 and 2A, the first contact 48 functions as a spring to bias the member 64 away from the electromagnet 40 at the deactuated position shown. However, in an alternate embodiment, any suitable means could be used to bias the member 64 away from the electromagnet. In this embodiment the front end 78 of the contact section 68 is biased against a rear end 80 of the push button 22. The push button 22 is preferably the same as the push button described in U.S. Pat. No. 5,889,259. However, any suitable user actuated member could be provided, such as a rocker switch. The push button 22 includes a spring 82 which biases the push button in a forward direction.

Referring also to FIG. 3A, a portion of the toast operation control is shown in a second partially actuated position. The button 22 is being pushed inward by a user. The button 22 moves the member 64 towards the electromagnet 40. The first contact 48 move with the member 64 such that the contact area 54 contacts the contact area 58 to electrically connect the two contacts 48, 50 to each other. The second contact 50 is connected to the printed circuit board 36 and the first contact 48 is connected to the cord 38. Thus, the contacts 48, 50 result in electricity being supplied to the board 36. As a result, the board 36 energizes the electromagnet 40. As the user continues to push the button 22 in an inward direction, as shown in FIG. 3B, the member 64 is moved against the front end of the electromagnet with the ferromagnetic section 66 being held by electromagnetic attraction against the electromagnet 40. In this fully actuated position, the first contact 48 has been further deflected such that the contact area 56 contacts the contact area 60 of the third contact 52. The third contact 52 is electrically connected to the heating elements 16. Thus, electricity can now be supplied from the first contact 48, to the third contact 52, and to the heating elements 16. The printed circuit board 36 and thermostat 26 can also preferably regulate the supply of the electricity to heating elements 16. When the user releases the button 22 as shown in FIG. 3C, the spring 82 returns the button 22 back to its home deactuated position. However, the electromagnetic attraction of the electromagnet 40 keeps the ferromagnetic section 66 against the electromagnet at its fully actuated position. This keeps the member 64 and the first contact 48 at the fully actuated position. The button 22 and member 64, thus, become spaced from each other. The printed circuit board 36 keeps the electromagnetic energized during the toast cycle. At the completion of the toast cycle the printed circuit board 40 deenergizes the electromagnet 40. With the magnetic holding force of the electromagnet against the ferromagnetic section terminated, the first contact 48 functions as a spring to bias the contact 48 and the member 64 back to the deactuated position shown in FIGS. 2 and 2A.

One of the features of the present invention is in regard to the operation of the toast operation control in the event of an interruption in supply of electricity. In the event of a general power failure, such as a blackout, when the oven is in a toast cycle (i.e.: at the actuated position shown in FIG. 3C) the electromagnet 40 automatically deactivates. This results in the control returning to the deactuated position shown in FIG. 2. When the supply of electricity is re-established, the toast function remains OFF until a user presses the push button 22 again. This is because, even thought the printed circuit board 36 might energize the electromagnet 40 again, the ferromagnetic section 66 is far enough away from the electromagnet that the electromagnet's magnetic field is insufficient to automatically move the member 64 and first contact 48 back to the actuated position. Thus, the toast function remain OFF. The printed circuit board 36 will eventually time-out and discontinue supply of electricity to the electromagnet. The present invention insures that the toast cycle does not automatically come back ON after the end of a power supply interruption; such as when a user may not be present or when a user may be asleep. The printed circuit board 36 can be adapted to function the same way if the door 14 is opened during a toast cycle; the slider 44 interrupting supply of electricity when the contacts 46 are separated. Alternatively, the printed circuit board can be adapted not to de-energize the electromagnet 40 if the door 14 is opened.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An electric appliance control comprising:

an electromagnet;

an electrical switch assembly;

a ferromagnetic section movable with a contact of the switch assembly towards the electromagnet;

a user actuated member adapted to move the ferromagnetic section and the contact towards the electromagnet, wherein, when the electromagnet is energized and the ferromagnetic section and contact are moved by the user actuated member to an actuated position, the electromagnet can retain the contact at the actuated position by magnetically holding the ferromagnetic section at the actuated position.

2. A control as in claim 1 wherein the ferromagnetic section is fixedly connected to the contact.

3. A control as in claim 1 wherein the ferromagnetic section is directly connected to a mechanical contact section adapted to be directly contacted by a user actuated member.

4. A control as in claim 1 further comprising a user actuated member adapted to move the ferromagnetic section from a deactuated position to the actuated position.

5. A control as in claim 4 further comprising a spring biasing the user actuated member in a direction away from the ferromagnetic section.

6. A control as in claim 1 wherein the contact biases the ferromagnetic section in a direction away from the electromagnet.

7. A control as in claim 1 wherein when the electromagnet is energized, the electromagnet has a magnetic field which is insufficient to automatically move the ferromagnetic section to the actuated position without a user at least partially moving the ferromagnetic section towards the actuated position.

8. An electric toaster oven comprising:

a housing;

heating elements connected to the housing; and a control for controlling the heating elements, the control comprising:

a ferromagnetic member connected to an electrical contact of a switch assembly, the switch assembly being connected to the heating elements, the ferromagnetic member being biased by the contact towards a deactuated position, and the contact being movable with the ferromagnetic member towards an actuated position;

an electromagnet having a magnet field which, when the ferromagnetic member is located at the actuated position and the electromagnet is energized, magnetically attracts the ferromagnetic member towards the electromagnet, and wherein the field is insufficient to move the ferromagnetic member to the electromagnet when the ferromagnetic member is at the deactuated position, wherein, when the ferromagnetic member is located at the actuated position and supply of electricity to the toaster oven is interrupted, the ferromagnetic member is moved to the deactuated position and, if the supply of electricity to the toaster oven is subsequently re-established, the electromagnet cannot automatically move the ferromagnetic member back to the actuated position.

9. A toaster oven as in claim 8 wherein the ferromagnetic member is fixedly connected to the contact.

10. A toaster oven as in claim 8 further comprising a user actuated member and wherein the ferromagnetic section is directly connected to a mechanical contact section adapted to be directly contacted by the user actuated member.

11. A toaster oven as in claim 8 further comprising a user actuated member adapted to move the ferromagnetic section from the deactuated position to the actuated position.

12. A toaster oven as in claim 11 further comprising a spring biasing the user actuated member in a direction away from the ferromagnetic section.

13. A method of preventing automatic re-energization of an electrical appliance after an interruption in supply of electricity to the appliance, the method comprising steps of:

biasing a ferromagnetic section by a biasing force towards a deactuated position, the ferromagnetic section being adapted to move a contact of an electrical switch assembly, the ferromagnetic section being movable between the deactuated position wherein a portion of the switch assembly is OFF and an actuated position wherein the portion of the switch assembly is ON;

applying an electromagnetic force by an electromagnet to the ferromagnetic section when the ferromagnetic section is moved towards the actuated position to hold the ferromagnetic section at the actuated position; and moving the ferromagnetic section by the biasing force, when the supply of electricity to the appliance is interrupted, to move the ferromagnetic section to the deactuated position, wherein the deactuated position is sufficiently far enough away from the electromagnet to prevent the electromagnet from automatically moving the ferromagnetic section back to the activated position when the supply of electricity is reactivated.

14. A method as in claim 13 wherein the step of biasing comprises the contact biasing the ferromagnetic section towards the deactuated position.

15. A method as in claim 13 further comprising allowing movement of the ferromagnetic section back to the actuated position, after the supply of electricity is reactivated, by a user actuated member.

16. A method as in claim 13 wherein the ferromagnetic section is movable by a user actuated member towards the actuated position, and wherein the user actuated member is biased in a direction away from the ferromagnetic member.

17. A method as in claim 16 wherein the ferromagnetic section is connected to a mechanical contact member which is attached to the contact, and wherein the contact biases the mechanical contact member against the user actuated member at the deactuated position.

18. A method as in claim 16 further comprising allowing the ferromagnetic section and the user actuated section to independently move relative to each other.

* * * * *